Aug. 30, 1966   J. L. HELMS   3,269,863
STORAGE BATTERY PLATE
Filed July 2, 1965   3 Sheets-Sheet 1

INVENTOR.
Jerry L. Helms
BY
*J.C. Evans*
His Attorney

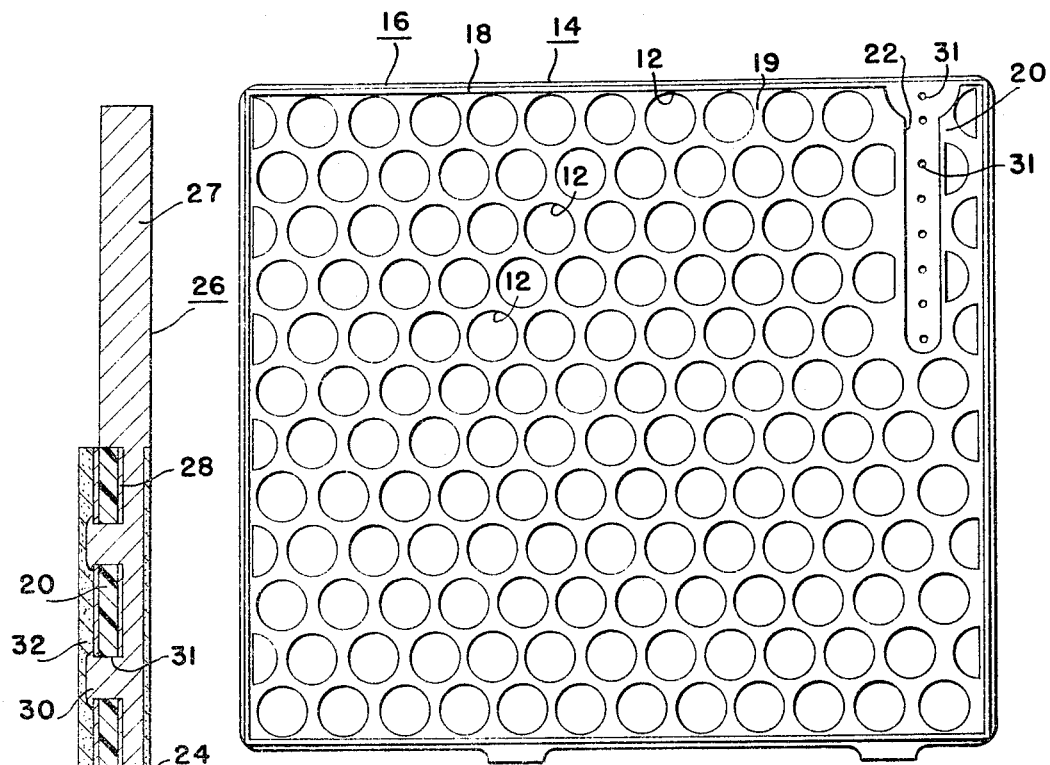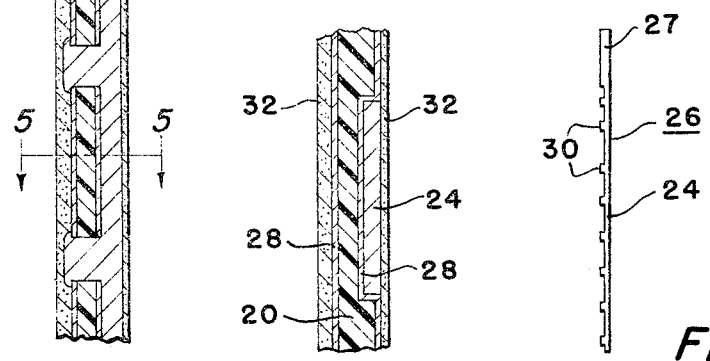

United States Patent Office 3,269,863
Patented August 30, 1966

3,269,863
STORAGE BATTERY PLATE
Jerry L. Helms, Muncie, Ind., assignor to General Motors Corporation, Detroit, Mich., a corporation of Delaware
Filed July 2, 1965, Ser. No. 469,101
3 Claims. (Cl. 136—36)

This invention relates to storage battery components and more particularly to battery plates and their manufacture.

In the development of storage batteries, it has been recognized that it would be desirable to form the basic battery plate grid for the negative and positive plate components at least in part of a low-cost, light-weight material rather than lead or the like. Hence, in the past, various approaches have been proposed such as using gauze material fiber glass, polystyrene foam, asbestos and other open-cell, porous core structures covered by a metallic coating to form the basic battery plate grid. In such grid constructions there is a problem of producing a good electrical connection between the conductive surface on the grid and a terminal for directing current therefrom as well as a sound mechanical connection between the grid and the terminal.

Accordingly, it is an object of the present invention to improve plate components for a lead acid storage battery or the like by utilizing a high-strength molded, non-porous, thin plastic grid core having an offset border wherein the core is covered by a substantially coextensive conductive metal coating and an overpasting of active material retained in place by the border and wherein the weight of the plastic portion of the plate is relatively small compared to the weight of the metallic coating forming the conducting area of the plate.

A further object of the present invention is to improve battery plate components by the provision of a thin-sheet, high-strength, non-porous, molded plastic core covered with a coextensive metallic conductive coating and including an improved terminal connection fixedly secured to the plate core to form an unusually sound mechanical connection along with a good electrical contact with the conductive metallic coating.

A further object of the invention is to improve battery plates of the aforementioned type by the provision of a reinforced terminal support region on the plastic core grooved to supportingly receive a terminal lug having a stem portion with integral fasteners thereon for securing the lug to the core in good electrical contact with the metallic coating wherein the groove edges prevent undesirable movement of the lug with respect to the metal coating.

A still further object of the present invention is to improve the manufacture of battery plates having lightweight non-conductive grid cores by preforming the core from a high-strength, non porous plastic material to have a reinforced terminal support region and a thickened peripheral border, roughening its surface, applying a coextensive conductive coating on the core and fixing a terminal lug to the support region so as to produce a sound mechanical connection between the conductive coating and the terminal.

Further objects and advantages of the present invention will be apparent from the following description, reference being had to the accompanying drawings wherein preferred embodiments of the present invention are clearly shown.

In the drawings:

FIGURE 3 is an enlarged view in vertical section taken along the line 3—3 of FIGURE 1;

FIGURE 4 is an elevational view of a terminal lug in the present invention;

FIGURE 5 is a section on line 5—5 of FIGURE 3;

FIGURE 6 is a front elevational view of a plastic grid or core in the present invention.

Figure 2:
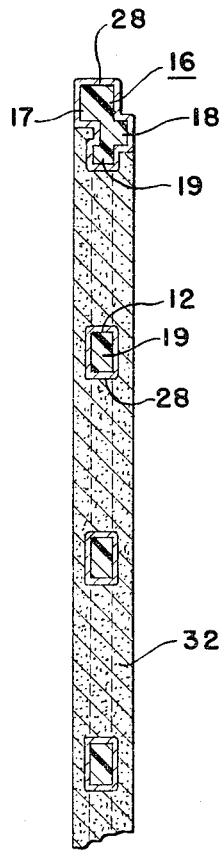
FIGURE 2 is an enlarged view in vertical section taken along the line 2—2 of FIGURE 1.
Figure 1:
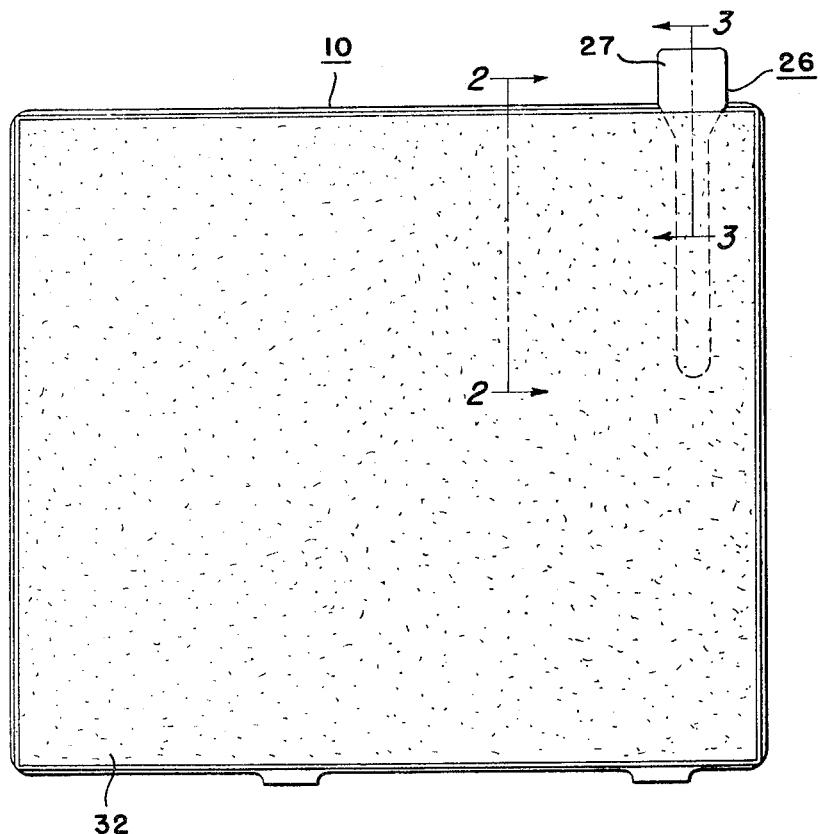
FIGURE 1 is a view in front elevation of a battery plate construction in accordance with the present invention.

Referring now to FIGURES 1 through 3 a storage battery component 10 is illustrated of the type suitable for use in a lead acid storage battery used on automotive applications or the like. In such structures it is appreciated that the plate has either negative or positive characteristics depending on the active materials therein that react chemically with an electrolytic solution to produce a flow of direct current from the battery.

The present specification will be directed to the negative plate structures with it being understood that by changing the active materials the structures are equally suited for use in positive plate structures.

The plate 10 is illustrated as including a plurality of diagonally arranged openings 12 in a plastic core 14, forming a grid pattern across the planar extent thereof as best seen in FIGURE 6. The plastic grid or core 14 is of high-strength, non-porous molded plastic material such as polystyrene or polypropylene. The core 14, more particularly, includes a peripheral edge or border 16 having oppositely directed raised edges 17, 18 raised from and surrounding a thin interior sheet 19 having the openings 12 therein. By the provision of such a core the plate 10 is made lightweight without reducing its strength. Moreover, by substituting plastic for lead, the cost of the plate is greatly reduced.

In the illustrated arrangement the core 14 includes a reinforced corner region 20 in the sheet 19 with a recess 22 formed therein for guiding and supportingly receiving the stem or base portion 24 of a terminal lug 26 having an enlarged head 27 directed exteriorly of the border 16 around the core 14.

The plastic core 14 is coated by a conductive layer of material, for example, a layer 28 of lead for forming a substantial planar coextensive conductive surface on both faces of the core for current flow to the terminal 26 off the plate 10. The sheet 19 is roughened on the opposite faces thereof to help retain the layer 28 of lead in place. In the corner region 20 the coating of lead is disposed between the terminal 24 and the plastic core 14 and is held in good electrical contact therewith by plural integral fasteners or rivet-like portions 30 on the base 24 of the lug 26 that are directed through preformed connector openings 31 in the core 14 and turned over at their ends in interlocking engagement with the opposite side of core 14 flush with or below the border 16, as best seen in FIGURE 3.

In addition to effecting an unusually good electrical contact between the terminal 26 and electrical conductive coating 28 the base 24 also, by virtue of the above-described arrangement, is securely mechanically connected to prevent vibrational loadings and the like on the terminal from separating it from the remainder of the plate construction. Moreover, the edges of the groove 22 hold the lug stem 24 against movement relative to the coated core 14 that might wear, crack or otherwise undesirably affect the low-strength, thin metallic coating 28 so as to destroy the good electrical contact between coating 28 and lug 26.

The core or grid structure 14 illustrated in the first embodiment is characterized by the fact that the thickness of the sheet 19 thereof is substantially less than the greatest dimension of the openings 12 formed therein.

Accordingly, the grid pattern formed by the core 14 has a substantial portion thereof occupied by openings for receiving active material or paste 32 for producing the electrolytic exchange for producing current flow from the conductive surface. The paste 32 overlies the sheet 19 on both sides thereof and is held to an overpaste thickness determined by the raising of edges 17, 18 above sheet 19 on either side thereof. The edges also serve to establish a desired plate thickness for maintaining lateral stability against movement between plates assembled in a battery construction. The core 14, even though relatively open, has sufficient strength for heavy-duty applications. Moreover, by virtue of the strength of the core 14, the lead or other conductive material coating thereon primarily serves a current transfer function. Thus, in the case of lead, no strength producing alloy agent such as antimony is required.

Figure 7:
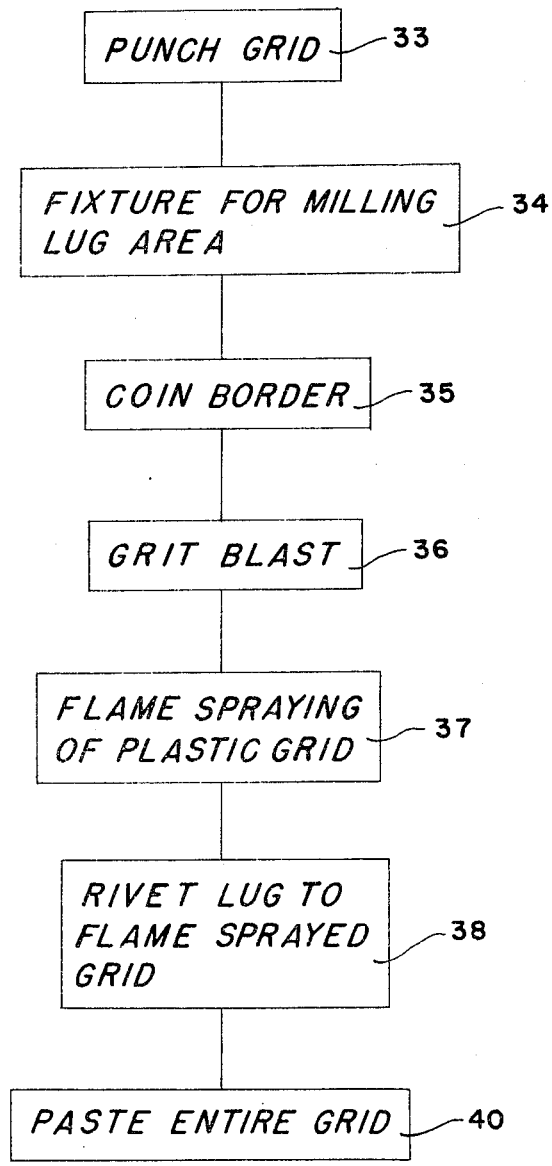
FIGURE 7 is a flow chart showing the novel process of manufacturing applied to the combination of FIGURES 1 through 3.

Referring now to the flow chart of FIGURE 7, in accordance with certain principles of the present invention, the plate assembly of FIGURES 1 through 3 is assembled by an improved process of manufacturing including an initial step 33 of suitably forming the plastic grid core 14, for example, by blanking out openings 12 and 31 in a flat sheet of high-strength, plastic stock. Then the channel or groove 22 is formed by suitable means such as a milling operation 34. The edge 16 of the core 14 is then formed by a coining operation 35 to form the thickened, raised edges 17, 18 thereon. Following the formation of the plastic grid a grit blasting step 36 is carried out wherein a suitable abrasive material, for example, 100 mesh $Al_2O_3$ is directed against the faces of the plastic core 14 for producing a desired roughening of the faces thereof. The core 14 with its roughened faces then passes through a flame spraying station or metallizing step 37 wherein lead is sprayed against the roughened surfaces to a predetermined coating preferably having a thickness of .006 inch with a minimum coverage of .003 to .004 inch for forming the conductive layer on the core 14. Then, a terminal connecting step 38 is carried out where a preformed lug like 26 in the first embodiment is guidingly directed into supported relationship with the coated core by the recess 22 formed in the core 14 and the base of the lug is connected to the coated core by riveting.

Following the riveting step, the unit is passed through a pasting station 40 wherein a suitable active material is placed in the openings 12 to an overpaste thickness determined by edges 17, 18 for completing the battery plate construction 10.

While the preferred manufacturing process flame spraying is utilized to form the conductive layer 28, it is also contemplated by the present invention that other metal coating processes, for example, vacuum metallizing, electroplating and application of powdered material to a slightly softened plastic base are also suited for forming plates of the type illustrated. Moreover, if desired, the corner region 20 can be coated by a preliminary step prior to coating the complete core 14. Following this partial coating the lug 26 is fastened to the core 14, then the core 14 and lug 26 can be coated to improve electrical contact between core 14 and lug 26 if desired.

By virtue of the above-described invention, along with the improved methods of assembly thereof, it will be apparent to one skilled in the art that an unusually thin plate construction is formed that will have very desirable strength properties along with good electrical current conducting properties. Additionally, the invention is further characterized by a substantial reduction in cost by the provision of a high-strength, non-conductive, non-porous, plastic core that is substituted for lead or the like found in present basic battery plate grids. Notwithstanding the use of such low-cost, non-conductive core materials, the embodiments of the invention are further characterized by particular terminal to plate connecting arrangements that are characterized by having good mechanical strength properties as well as desirable electrical conducting properties for removing current from the conductive surface across the full planar extent of the plates and thence through a terminal directed therefrom to a terminal post or the like in a chemical battery unit made up of a plurality of such plates.

While the embodiments of the present invention as herein disclosed constitute preferred forms, it is to be understood that other forms might be adopted.

What is claimed is as follows:

1. In a battery plate structure the combination of, a sheet of molded non-porous plastic having a plurality of grid openings through a first predetermined part of the planar extent thereof, said sheet including a second predetermined portion thereof running from the edge of the sheet interiorly hereof that is unperforated by grid openings, said second predetermined portion of said sheet having a groove formed therein extending to the edge of the sheet, said second predetermined portion of said sheet having a plurality of aligned connector openings therein directed therethrough, said sheet having opposite faces therein, a metallic coating coextensive with the faces of said sheet, said coating extending across said second predetermined portion throughout the extent of the groove therein, a terminal element of electrically conductive material having a stem portion thereof disposed on said second predetermined portion of said sheet and having side portions thereof fitted into said groove, said terminal element having a plurality of integral projections thereon located on said stem at spaced apart points therealong, said projections being directed through said spaced apart connector openings in said second predetermined portion of said sheet of plastic material, each of said projections having a head portion thereon overlying the face on said sheet opposite to said grooved surface portion for securing said terminal against relative movement with respect to said plastic grid and for holding said terminal stem in good electrical contact with said metallic coating covering said grooved portion of said sheet.

2. In a battery plate structure the combination of, a sheet of molded non-porous plastic having a plurality of grid openings through a first predetermined part of the planar extent thereof, said sheet including a second predetermined portion thereof running from the edge of the sheet interiorly thereof that is unperforated by grid openings, said second predetermined portion of said sheet having a groove formed therein extending to the edge of the sheet, said second predetermined portion of said sheet having a plurality of aligned connector openings therein directed therethrough, said sheet having opposite faces therein, a metallic coating coextensive with the faces of said sheet, said coating extending across said second predetermined portion throughout the extent of the groove therein, a terminal element of electrically conductive material having a stem portion thereof disposed on said second predetermined portion of said sheet and having side portions thereof fitted into said groove, said terminal element having a plurality of integral projections thereon located on said stem at spaced apart points therealong, said projections being directed through said spaced apart connector openings in said second predetermined portion of said sheet of plastic material, each of said projections having a head portion thereon overlying the face on said sheet opposite to said grooved surface portion for securing said terminal against relative movement with respect to said plastic grid and for holding said terminal stem in good electrical contact with said metallic coating covering said grooved portion of said sheet, said sheet including a peripheral edge having a portion thereof directed substantially continuously around the outer edge of said sheet and extending outwardly of said sheet from one face thereof, said peripheral edge of said sheet including another portion thereof formed substantially continuously around the outer edge of the sheet and being directed outwardly of the opposite face of said sheet, a layer of active material on either face of said metallic coated sheet filling the grid openings in said sheet, said first portion of said peripheral edge defining a volume on one side of said sheet, said second portion of said edge forming a volume on the opposite face of said sheet, said active material filling said first and second volumes on either side of said sheet and being in part retained in place on said sheet by said continuously formed first and second edge portions, said first and second edge portions further serving to reinforce said unperforated second predetermined planar extent of said sheet to reduce flexure in the sheet causing relative movement between the stem of said terminal element and the coated groove in said sheet whereby said terminal and said coating are maintained in good electrical contact with one another.

3. In the combination of claim 2, said second predetermined portion of said sheet being located adjacent a corner of said sheet, said second predetermined portion having a segment of each of said continuously formed first and second edge portions directed longitudinally of the groove therein to reinforce the grooved portion against bending along the length thereof.

References Cited by the Examiner

UNITED STATES PATENTS

| | | | |
|---|---|---|---|
| 983,062 | 1/1911 | Kamperdyk | 136—63 |
| 1,509,186 | 9/1924 | Benner et al. | 136—58 |
| 2,355,933 | 8/1944 | Weiss | 117—138 |
| 2,439,654 | 4/1948 | Gaiser et al. | 117—138 |
| 2,694,099 | 11/1954 | Zahn | 136—58 |
| 2,861,115 | 11/1958 | Berg | 136—36 |

WINSTON A. DOUGLAS, *Primary Examiner.*

A. SKAPARS, *Assistant Examiner.*